United States Patent [19]

Hunstad et al.

[11] 4,361,888
[45] Nov. 30, 1982

[54] TECHNIQUE FOR INCREASING THE EFFICIENCY OF LOW PRESSURE, SHORT PULSE LASER SYSTEMS

[75] Inventors: Richard L. Hunstad, Forest Hills; William H. Kasner, Penn Hills Township, Allegheny County, both of Pa.

[73] Assignee: Westinghouse Electric Corp., Pittsburgh, Pa.

[21] Appl. No.: 163,021

[22] Filed: Jun. 24, 1980

[51] Int. Cl.³ .............................................. H01S 3/093
[52] U.S. Cl. ........................................ 372/55; 392/29
[58] Field of Search ...................... 331/94.5 G, 94.5 C

[56] References Cited
U.S. PATENT DOCUMENTS
3,581,230  5/1971  Smith ............................. 331/94.5 Q
4,238,741 12/1980  Kasner et al. ................. 331/94.5 PE

OTHER PUBLICATIONS

"Performance of a Compact Sealed 200-W CO₂ Laser", Faitlen, *IEEE Jour. of Quant. Elect.*, Oct. 1975.

Primary Examiner—William L. Sikes
Assistant Examiner—Leon Scott, Jr.
Attorney, Agent, or Firm—M. P. Lynch

[57] ABSTRACT

The depletion of energy stored in the transfer gas component of a low pressure, short pulse laser system following excitation of the laser gas medium consisting of a lasing gas component and a transfer gas component is achieved by extracting a plurality of output pulses by providing a sufficient delay between output pulses to permit the transfer of energy from the transfer gas component to the lasing gas component.

13 Claims, 3 Drawing Figures

TECHNIQUE FOR INCREASING THE EFFICIENCY OF LOW PRESSURE, SHORT PULSE LASER SYSTEMS

BACKGROUND OF THE INVENTION

The full efficiency and overall operational capability of many low pressure, short pulse laser systems is not realized due to the fact that a significant fraction of the excitation produced in the gas is not transferred to the lasing gas component. In some laser systems, such as the 14 micron and 16 micron $CO_2$ laser systems described in U.S. Pat. No. 4,168,474, issued Sept. 18, 1979 and pending application Ser. No. 863,193, filed Dec. 22, 1977, both assigned to the assignee of the present inventions and incorporated herein by reference, the excitation of the lasing atomic or molecular species is produced at least in part by energy transfer from a second excited atomic or molecular species. The second species is referred to as a transfer gas and can be excited by a number of methods such as electric discharge, electron beam, optical pumping, and so forth. These excitation processes may also tend to excite the lasing gas medium directly. In $CO_2$ laser systems, as referred to above, the energy transfer process is frequently used to excite the $CO_2$ molecules. Nitrogen is typically used as the transfer gas in these laser systems.

In order to achieve a higher efficiency from these laser systems it is necessary to transfer a larger fraction of the energy from the transfer gas to the lasing gas. This is particularly true for lasers operating in a short pulse output mode. In conventional $CO_2$ lasers operating at high pressures, i.e. greater than 300 Torr, it is possible to achieve efficient energy transfer during a relatively short, i.e., 1–3 $\mu$sec., laser output pulse because the energy transfer process is fast compared to the laser output pulse length. In other laser systems, such as a 16 micron $CO_2$ bending mode laser described in the above-referenced U.S. Patent and pending application, that operate at pressures less than 300 Torr and relatively short laser extraction output pulses, i.e., less than 1–3 $\mu$sec., the energy transfer process is slow compared to the laser output pulse length and a significant fraction of the excitation energy stored in the transfer gas is never used. There is described below with reference to the accompanying drawings a technique for overcoming this shortcoming in realizing improved efficiency in low pressure and short pulse output mode operation laser systems.

DESCRIPTION OF THE DRAWINGS

The invention will become more readily apparent from the following exemplary description in connection with the accompanying drawings.

DESCRIPTION OF THE PREFERRED EMBODIMENT

The novel technique disclosed herein for increasing the efficiency of pulsed laser systems that employ transfer gases involves a laser structure and a mode of operation whereby several laser output pulses are extracted from an excited laser gas volume by providing adequate time between pulses to permit energy to be transferred from the transfer gas, i.e., $N_2$, to the lasing gas, i.e., $CO_2$.

The disclosed technique can be used in either a static or flowing gas system. In the static gas system, this technique provides laser output pulse repetition frequencies (PRF) that may be several times higher than the excitation pulse rates. The application of the disclosed technique in a flowing gas system can produce either laser output energies that are several times higher than that observed under normal operation, or can produce higher frequency operation.

Figure 1:
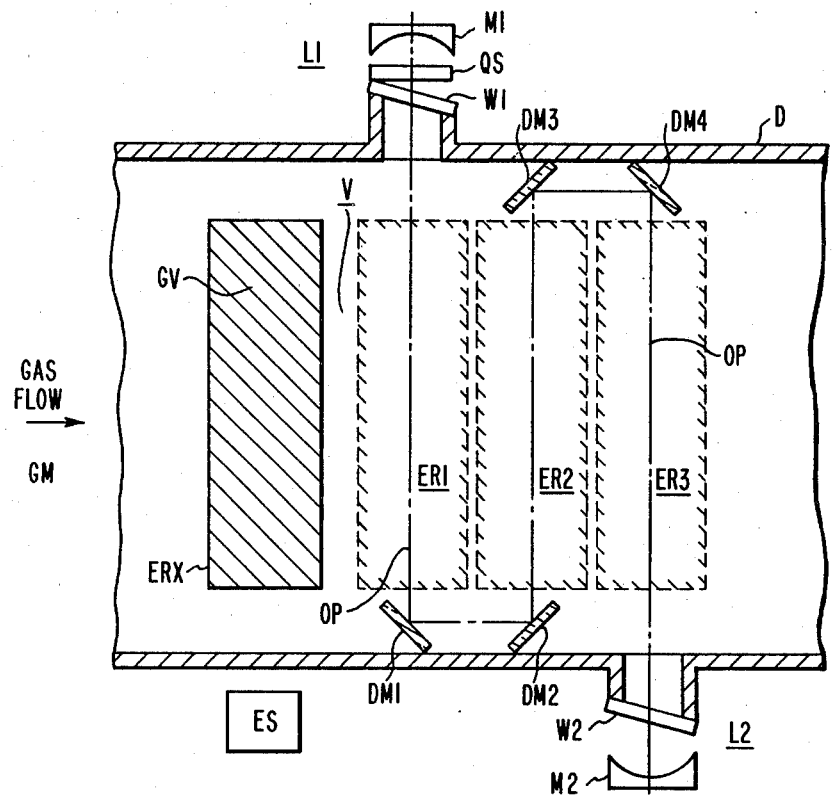
FIG. 1 is a sectioned schematic illustration of an embodiment of the invention.
Figure 2:
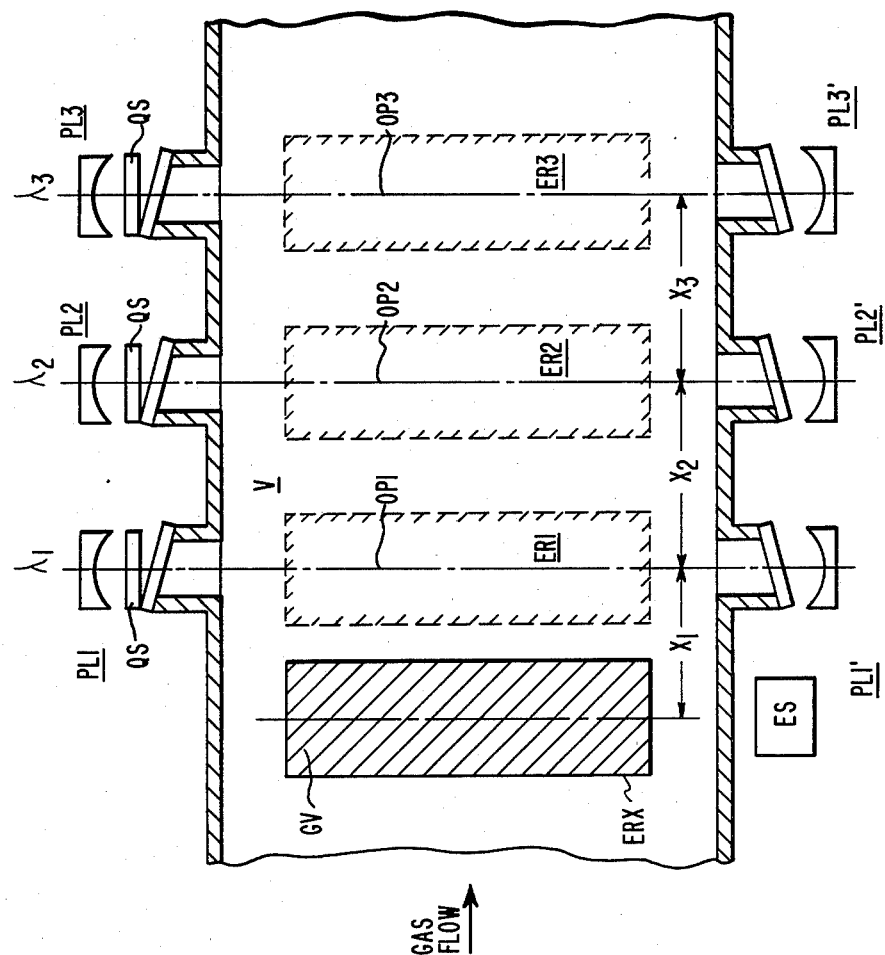
FIG. 2 is a sectioned illustration of an alternate embodiment of the invention.
Figure 3:
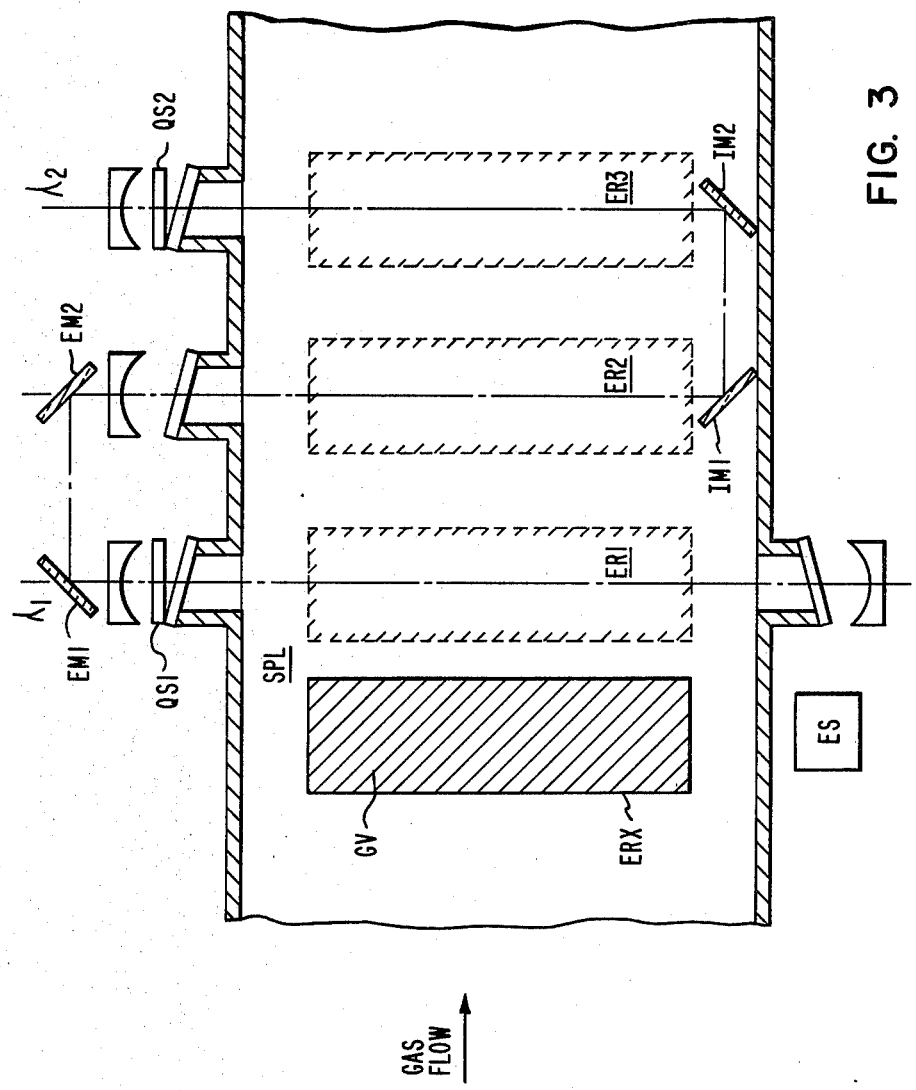
FIG. 3 is a sectioned illustration of yet another embodiment of the invention.

Several embodiments of the disclosed technique are depicted in the sectioned schematic illustrations of FIGS. 1, 2 and 3.

In the embodiment of FIG. 1, a laser gas medium GM consisting of a lasing gas, such as $CO_2$, a transfer gas, such as $N_2$, and possibly a buffer gas, such as He, flows through the laser duct D as indicated. A gas volume GV of the laser gas medium GM first passes through an excitation region ERX where the transfer gas, and in some cases, the lasing gas, are excited by an excitation source ES which may be implemented by one of a variety of techniques such as electrical discharge, electron beam, optical pumping, etc. The techniques for excitation of the lasing gas are well known and described in numerous prior art publications and as such do not constitute the invention of the subject application. Thus, the detail structure of such state of the art techniques has not been incorporated herein in order to avoid unnecessary detail. The excited laser gas mixture GV then flows through a laser output extraction volume V which corresponds to a volume within the duct D that is subdivided into multiple extraction regions. For the purposes of discussion the volume has been subdivided into three energy extraction regions ER1, ER2 and ER3 by the arrangement of optical deflecting mirrors DM1, DM2, DM3 and DM4 which define a folded optical path OP and a single laser cavity. The laser output optics L1 and L2 consisting of the combinations of mirror M1 and window W1, and mirror M2 and window W2, respectively, at either end of the optical path OP form the single optical cavity for the laser system 10.

While the pulse output mode of operation of the laser system 10 can be implemented by numerous state of the art techniques, a conventional Q-switch element QS has been chosen for the purpose of discussion. The operation of various devices for effecting pulse mode of operation are described in detail in the above-referenced pending applications. Various Q-switching and acousto-optic techniques are described in U.S. Pat. Nos. 3,713,032; 3,746,866 and 3,805,196 which are assigned to the assignee of the present invention and incorporated herein by reference.

In accordance with the teachings of the applicants' invention the distance between the energy extraction regions ER1 and ER2 and similarly the distance between the regions ER2 and ER3 are established by the positioning of the deflection mirrors DM1–DM4 such that the transit time of the flow of the excited laser gas medium GV from one region to the next region will be of sufficient duration to effect an efficient transfer of energy from the transfer gas component of the gas medium GM to the lasing gas component of the laser gas medium GM. The transit time between adjacent regions within the volume V, which translates into the time between successive laser output pulses from the optical cavity defined by the laser optics L1 and L2, is a function of the flow velocity of the laser gas mixture GM and the separation distances between the adjacent regions ER1, ER2 and ER3 of the optical discharge volume V. In accordance with the folded optical path configuration of FIG. 1 each volume of the laser gas medium GM which is excited in the excitation region ER contributes to multiple laser output pulses corresponding to each of the three regions ER1, ER2 and ER3. Thus, the efficiency of the laser system 10 as controlled by the Q-switch element QS is improved by utilizing more of the excitation energy stored in the transfer gas component of the gas mixture GV. While a three-excitation region system has been shown, it is apparent that the number of regions within a volume V can be increased through the use of additional internal mirrors thereby increasing the number of laser output pulses realized from a once excited volume of the laser gas medium GM. The operation of the pulse laser output device QS is such that the extraction of an output pulse coincides with the flow of the excited laser gas medium GV from one extraction region to the next. The output pulse is extracted when the excited laser gas medium GV reaches the next extraction region.

Further, the folded optical path concept of FIG. 1 provides a much longer optical path between the cavity mirrors M1 and M2 within the volume V. This extended optical path provides a correspondingly longer gain length which allows the laser output occurring at weaker transitions to build up toward a saturation limit. This feature is particularly useful where the object is to achieve high laser output energies on specific R branch lines which are typically weaker than the dominant Q branch lines. This is particularly of interest in the 16 micron $CO_2$ bending mode laser as described in the above-referenced U.S. Pat. No. 4,168,474 where the desired operation is on specific R branch lines that are weaker than the dominant Q branch lines. The capability of providing the opportunity of weaker transitions to build towards a saturation limit results in the laser output on the R branch lines of interest being increased by approximately a factor of 2 over and above any increase in laser output attained by extraction of several laser pulses from a given laser gas volume.

While the excitation region ERX is shown to be upstream and spaced apart from the first extraction region ER1 from the purpose of clarity, these regions may be coincidental.

The disclosed concept of deriving multiple laser output pulses in a low pressure, short pulse laser system from a single excited laser gas volume GV by delaying the extraction of consecutive output pulses to enable the remaining energy in the transfer gas component to be transferred to the lasing gas component of the gas mixture GM can also be implemented in alternative embodiments as shown in FIGS. 2 and 3.

In the embodiment of FIG. 2 the single optical path and cavity of FIG. 1 is replaced by multiple distinct optical paths and cavities defined by separate sets of windows and external mirror laser combinations PL1—PL1', PL2—PL2', and PL3—PL3' and defining laser combinations P1, P2 and P3, respectively, positioned in a spaced apart downstream configuration. The basic difference between this geometrical arrangement of FIG. 2 and the one shown in FIG. 1 is that each optical path OP1, OP2 and OP3 of the embodiment of FIG. 2 which traverse the optical cavity volume V constitutes an independent laser whereas the optical path segments within the regions ER1, ER2 and ER3 of FIG. 1 each form one leg of a single folded optical path OP.

The spaced-apart positioning of the laser combinations P1, P2 and P3 with respect to one another is such as to provide sufficient time between the laser cavities of the laser combinations at a given gas flow rate to permit energy from the transfer gas component in the flowing gas laser medium GM to be transferred to the lasing gas component following the extraction of the laser output pulse at the preceding laser combination such that an additional laser output pulse can be extracted when the flowing laser gas medium reaches the optical cavity of the next laser combination.

The wavelength of energy extracted from the laser combinations P1, P2 and P3 is identified as $\lambda 1$, $\lambda 2$ and $\lambda 3$, respectively. These wavelengths may be identical or each may be different. In a flowing laser gas medium wherein the lasing gas is $CO_2$ with operation in the 9-micron band, wavelengths $\lambda 1$, $\lambda 2$ and $\lambda 3$ could be three different lines in this 9.4 micron-transition. Alternatively for instance, one wavelength, i.e., $\lambda 1$, could be in the 9-micron transition whereas wavelengths $\lambda 2$ and $\lambda 3$ could be in the 10.6 micron transition. Once again, the positioning of the laser combinations P1, P2 and P3 in the downstream spaced-apart relationship of FIG. 2 is determined in part by the flow rate of the laser gas medium GM so as to assure adequate time between the extraction output pulses from the successive laser combinations to assure adequate time for transfer of energy from the transfer gas component to the lasing gas component of the flowing laser gas medium GM.

The timing of the pulse excitation of the laser gas medium GM in the excitation region ERX by the excitation source ES, if pulse excitation is indeed employed, must be synchronized with respect to the flow rate of the laser gas medium GM in the gas flow duct D to assure that the lasing gas component from which an output pulse is extracted in region ER1 is adequately re-excited by the transfer of energy from the transfer gas component by the time the volume of laser gas medium GM reaches the extraction region ER2. This relationship likewise pertains to the movement of the laser gas medium through subsequent downstream excitation regions, i.e., ER3, . . . Therefore, in each of the embodiments there is a relationship between the flow rate of the laser gas medium, and the positioning of the excitation region ERX and the extraction regions ER1, ER2, ER3, etc. which can be readily determined for a given situation.

Referring to yet a third embodiment illustrated in FIG. 3, the three-extraction regions ER1, ER2 and ER3 positioned within the volume V of the gas flow duct D are configured by mirrors and windows to define a first optical cavity consisting of extraction region ER1 and a second optical cavity consisting of the combination of extraction regions ER2 and ER3.

It will be assumed for the purpose of discussion that the lasing gas component of the flowing laser gas medium GM is $CO_2$ and that a 16-micron wavelength laser output is desired by pumping the lasing gas with a 9.4-micron laser beam in accordance with the teachings of the above-referenced U.S. Patent. In the configuration of FIG. 3, the single-pass optical cavity laser SPL defined by the optical cavity corresponding to the excitation region ER1 develops a pulse output through the Q-switch element QS1 of a wavelength $\lambda 1$ equal to 9.4 microns. The arrangement of external mirrors EM1 and EM2 cause all or a portion of the 9.4-micron output to be reflected into the extraction region ER2 and via internal mirrors IM1 and IM2 through the extraction region ER3 to produce an output pulse through the operation of the Q-switch element QS2 from the lasing gas component $CO_2$ of a wavelength $\lambda 2$ equal to 16 microns. The coatings on the mirrors EM1 and EM2 provide the desired transmission or reflection of the 9.4 micron laser beam. Such mirrors are commercially available. In this configuration the wavelength $\lambda 1$ extracted from the extraction region ER1 serves as the optical pumping wavelength for the emission of a second wavelength $\lambda 2$ from the optical cavity formed by the combination of extraction regions ER2 and ER3. The extraction of 16-micron output from a $CO_2$ laser medium in response to 9.4 wavelength energy, which is also available from the $CO_2$ gas laser, is described in detail in prior art publications including the above-referenced U.S. Patent as well as the publication of R. M. Osgood, Jr. published in Applied Physics Letters, volume 28, No. 6, Mar. 15, 1976, pp. 342-345.

While the above discussion has been directed to a laser gas medium employing $CO_2$ as the lasing gas component and $N_2$ as the transfer gas component, these components were chosen merely for the purposes of illustration. The concepts disclosed are equally applicable to other flowing laser gas systems.

What we claim is:

1. A method for extracting energy from a given volume of an excited active laser gas medium of a laser system operated in a short pulse output mode wherein the active laser gas medium includes a lasing gas component and a transfer gas component, the transfer gas component storing energy upon excitation of the active laser gas medium and transferring energy to the lasing gas component via collisional interaction, and wherein a single output pulse from said given volume of said excited active laser gas medium does not deplete the energy stored in the transfer gas component, comprising the step of, developing multiple output pulses from said given volume of excited active laser gas medium by establishing a time delay between consecutive output pulses during which time delay energy is transferred from said transfer gas component to said lasing gas component.

2. A method as claimed in claim 1 wherein said laser system operates at a pressure of approximately 300 Torr or less and the output pulses are of a duration of approximately 3 microseconds or less.

3. A method as claimed in claim 1 wherein said laser gas medium is a flowing laser gas medium.

4. A method as claimed in claim 1 wherein said laser gas medium is a static laser gas medium.

5. A method as claimed in claim 1 wherein said excited active laser gas medium is a flowing laser gas medium and said output pulses from said given volume of excited active laser gas medium occur at a plurality of spaced apart pulse output locations in said flowing laser gas system, the time delay between the development of consecutive output pulses being established as a function of the flow rate of said given volume of the excited active laser gas medium relative to the spaced apart pulse output locations to permit the transfer of energy from said transfer gas component to said lasing gas component following the development of an output pulse from the previous pulse output location.

6. A method as claimed in claim 5 further including the step of, optically coupling said pulse output locations to form a folded optical path within said laser system, and optically extracting from said laser system a laser output pulse comprised of the combination of each of the output pulses developed from said given volume of the excited active laser gas medium at the respective pulse output locations.

7. A method as claimed in claim 5 further including the step of optically extracting from said laser system each output pulse developed from said given volume of the excited active laser gas medium at the respective pulse output locations as separate laser output pulses.

8. A method as claimed in claim 5, further including the steps of;

optically combining the output pulses from a first group of one or more pulse output locations and extracting said combined output pulses as a first laser system output pulse from said laser system, said first laser system output pulse being of a first wavelength, optically introducing said first laser system output pulse into said flowing given volume of the excited active laser gas medium of said laser system as an optical pumping wavelength for said flowing given volume of the excited active laser gas medium at a second group of one or more pulse output locations, and optically extracting from said second group of pulse output locations a second laser system output pulse of a second wavelength.

9. In a low pressure laser system operating in a short pulse output mode including a lasing gas component and a transfer gas component which stores energy upon excitation of the active laser gas medium and transfers energy to the lasing gas component via collisional interaction, wherein a single output pulse from a given volume of the excited active laser gas medium does not deplete the energy stored in the transfer gas component, a combination of, means for developing multiple output pulses from a given volume of said excited active laser gas medium by establishing a time delay between consecutive output pulses during which time delay energy is transferred from said transfer gas component to said lasing gas component.

10. A low pressure laser system as claimed in claim 9 wherein said laser system operates at a pressure of approximately 300 Torr or less and the output pulses are of a duration of approximately 3 microseconds or less.

11. A low pressure laser system as claimed in claim 9 wherein said excited active laser gas medium is a flowing laser gas medium and further including, two or more pulse output locations spaced apart in the flowing laser gas system, each pulse output location including first optical means spaced apart and defining an optical path therebetween which is transverse to the flowing laser gas medium, the location of said spaced apart pulse output locations being such as to permit the transfer of energy from said transfer gas component to the lasing gas component in a given volume of said excited laser gas medium during the time said given volume flows from one output pulse location to an adjacent pulse location, said spaced apart optical elements at the respective pulse output locations developing output pulses from said given volume of the excited active laser gas medium, said first optical means being arranged to couple said pulse output locations to form a folded optical path within said laser system and, second optical means to optically extract a laser system output pulse from said laser system comprised of a combination of the output pulses developed from said given volume of said excited active laser gas medium at the respective pulse output locations.

12. A low pressure laser system as claimed in claim 9 wherein said excited active laser gas medium is a flowing laser gas medium and further including, optical means separately associated with each of said pulse output locations to separately extract laser system output pulses from said given volume of excited active laser gas medium at the respective pulse output locations.

13. A low pressure laser system as claimed in claim 9 wherein said excited active laser gas medium is a flowing laser gas medium and further including, first optical means associated with a first group of one or more pulse output locations for combining the output pulses developed at said first group of output locations and extracting the combination of output pulses as a first laser system output pulse from said given volume of said excited active laser gas medium, said first laser system output pulse being of a first wavelength, second optical means for introducing said first laser system output pulse into said given volume of said flowing excited active laser gas medium to optically pump said given volume of said excited active laser gas medium at a second group of one or more pulse output locations, and third optical means for extracting from said optically pumped given volume of said excited active laser gas medium a second laser system output pulse of a second wavelength from said laser system.

* * * * *